United States Patent
Plant

[11] Patent Number: 5,752,705
[45] Date of Patent: May 19, 1998

[54] PISTON RINGS

[75] Inventor: Robert Plant, Bradford, England

[73] Assignee: AE Piston Products Limited, United Kingdom

[21] Appl. No.: 145,713

[22] Filed: Oct. 25, 1993

Related U.S. Application Data

[63] Continuation of Ser. No. 536,603, filed as PCT/EP89/01441, Nov. 27, 1989, abandoned.

Foreign Application Priority Data

Dec. 1, 1988 [GB] United Kingdom ............ 8828028
Mar. 31, 1989 [GB] United Kingdom ............ 8907329

[51] Int. Cl.$^6$ .................................................. F16J 9/00
[52] U.S. Cl. .................. 277/466; 277/434; 29/888.07; 29/888.073; 72/65; 72/168
[58] Field of Search ................ 277/216, 217, 277/171, 172, 173, 236; 29/888.07, 888.073, 888.075, 888.076, 33 S, 33 Q, DIG. 3, DIG. 19, 888.3; 51/290; 72/138, 64, 65, 168, 173, 177

[56] References Cited

U.S. PATENT DOCUMENTS

| | | | |
|---|---|---|---|
| 1,100,404 | 6/1914 | Sheperdson | 72/65 |
| 1,257,435 | 2/1918 | Williams | 72/64 |
| 1,292,101 | 1/1919 | Shaw | 277/217 |
| 1,321,539 | 11/1919 | Mummert | 277/217 |
| 1,546,526 | 7/1925 | Wasson | 29/888.073 |
| 1,584,470 | 5/1926 | Quintenz | 277/172 X |
| 1,783,047 | 11/1930 | Marshall | 51/290 X |
| 2,222,922 | 11/1940 | Wallace | 277/217 |
| 2,302,970 | 11/1942 | Melrose | 277/217 |
| 2,459,395 | 7/1949 | Smith | 277/216 |
| 2,654,977 | 10/1953 | Squibb et al. | 29/888.075 X |
| 2,748,453 | 6/1956 | Haldeman | 29/888.07 |
| 2,766,085 | 10/1956 | Muller | 277/217 |
| 2,827,688 | 3/1958 | Squibb | 29/888.07 |
| 3,608,347 | 9/1971 | Hemminer | 29/888.3 X |
| 3,805,352 | 4/1974 | de Montremy | 29/888.07 |
| 3,862,480 | 1/1975 | Packard et al. | 277/216 X |
| 3,980,310 | 9/1976 | Packard et al. | 277/216 X |
| 4,080,815 | 3/1978 | Foster | 72/65 X |
| 4,367,641 | 1/1983 | Mizutani | 72/65 |
| 4,761,979 | 8/1988 | Hawaguchi et al. | 72/173 X |
| 4,796,449 | 1/1989 | Berne | 72/173 X |

FOREIGN PATENT DOCUMENTS

| | | |
|---|---|---|
| 157537 | 10/1985 | European Pat. Off. . |
| 165417 | 12/1985 | European Pat. Off. . |
| 843281 | 6/1939 | France ............ 72/65 |
| 614487 | 6/1935 | Germany ............ 29/888.07 |
| 3305873 | 2/1984 | Germany . |
| 298259 | 10/1928 | United Kingdom ............ 277/172 |
| 452057 | 8/1936 | United Kingdom ............ 277/172 |
| 492141 | 9/1938 | United Kingdom ............ 277/216 |
| 513407 | 10/1939 | United Kingdom . |
| 849130 | 9/1960 | United Kingdom . |
| 2137660 | 10/1984 | United Kingdom . |
| 2155828 | 10/1985 | United Kingdom . |
| 2162923 | 2/1986 | United Kingdom . |
| 2164418 | 3/1986 | United Kingdom . |
| 2155587 | 9/1987 | United Kingdom . |
| 2220600 | 1/1990 | United Kingdom . |

*Primary Examiner*—Daniel G. DePumpo
*Attorney, Agent, or Firm*—Nixon & Vanderhye P.C.

[57] ABSTRACT

A piston ring being planar, having a dished section and a planform giving desired radial pressure distribution on a co-operating cylinder wall and which ring is made form a steel resistant to stress relieving at the piston ring operating temperature. The dishing may be either positive or negative and may lie in the range from 0.025 to 0.75 mm. A method and apparatus are also described for the manufacture of such rings.

6 Claims, 10 Drawing Sheets

FIG.11
STRIP TRACKING TASK

STRIP VELOCITY SERVO
FIG.12

BENDING POSITION SERVO
FIG.13

PISTON RINGS

This is a continuation of application Ser. No. 07/536,603, filed as PCT/EP89/01441, Nov. 27, 1989, now abandoned.

The present invention relates to piston rings and particularly though not exclusively to piston rings for internal combustion engines. The invention further relates to a method and apparatus for forming piston rings according to the invention.

Piston rings having a dished form, mainly for use in the compression positions in the top and/or second ring grooves, are known. The purpose of the dished form is to effect a line seal between the piston ring, its groove and the co-operating cylinder wall to give improved efficiency.

Heretofore such rings have been made by providing them with a non symmetrical section about the central plane. Typical section forms have included a bevel, step or rabbet on an internal peripheral edge. Closure of the ring on insertion into the cylinder bore induces a twist or dish into the piston ring.

Problem arise with this method of producing a dished form. Firstly, the degree of dishing varies around the ring from a maximum at about 180° from the ring gap to a minimum at the free ends. Secondly, the piston ring is not planar which tends to make the side face seal less efficient. The variable twist and the non-planar form can make the operation of the ring unreliable under dynamic conditions. For example, the seal may break in an unpredictable manner under inertia loading when the piston ring leaves the bottom face of the ring groove and moves to the top face during piston travel reversal, thus causing increased gas blow-by and oil consumption. Furthermore, the radial pressure distribution exerted by the ring on the cylinder wall becomes non-uniform.

A further disadvantage with such prior art rings is that it is not practicable to give thermo-chemical treatments to improve ring wear characteristics, for example, due to the unpredictable distortion which may occur.

A yet further disadvantage with known rings is that the step or bevel tends to increase the dead volume in the ring groove. Such an increase is disadvantagous with regard to noxious emissions and which all vehicle and engine manufacturers are trying to reduce.

It has now been found that dished rings may be made which are planar and have a controlled degree of twist or dishing around their entire peripheral length and which overcome the other disadvantages of the prior art rings above.

According to the present invention a piston ring for a piston comprises a single ring in a co-operating piston ring groove, the piston ring being planar, having a dished section, a planform giving a desired radial pressure distribution on a co-operating cylinder wall and which ring is made from a steel resistant to stress relieving at the piston ring operating temperature.

In one embodiment of a piston ring of the present invention the piston ring may, when closed into a co-operating cylinder, exert a substantially uniform pressure distribution on the cylinder wall. The free shape of the unconstrained piston ring may, however, be made such as to produce any desired pressure distribution pattern on the cylinder wall.

The degree of twist along the peripheral length of the ring may be non-uniform and may, for example, have a maximum degree of twist at the ring free ends where the seal tends to deteriorate first with conventional rings.

According to a second aspect of the present invention a method of making a piston ring includes the steps of forming a desired planform shape from steel wire in a forming machine and forming a desired degree of twist in the piston ring.

The desired planform shape and the twist in the piston ring may be done either in a continuous operation or sequentially and, in the latter case, may be carried out in the same or in a different forming machine.

In one embodiment of a method according to the present invention, the method comprises the steps of driving a metal strip into wire twisting means and inducing a desired degree of twist into the strip, pushing the twisted wire into first bending means to produce a curve of pre-determined radius of curvature and feeding the curved and twisted strip into second bending means to vary the radius of curvature in a pre-determined manner.

Forming operations may be carried out on numerically controlled wire bending apparatus of the type described in published European patent application No. 0 157 537 or in British patent number 2220600, the apparatus being suitably modified to introduce a twist into the wire. Alternatively, known cam-controlled wire bending apparatus suitably modified to introduce a controlled twist into the wire may be employed.

Modifications to numerically or cam-controlled bending apparatus may comprise the inclusion of wire twisting means controlled in synchronism with the ring forming operation. Such wire twisting means may include a grooved arm for receiving a wire strip, the arm being operated by a computer controlled eccentric or may comprise a pair of relatively axially displaceable, grooved members operating under computer control.

In one embodiment of apparatus for forming piston rings according to the present invention there is provided means for straightening and driving a metal strip into twisting means for twisting said metal strip in a controlled manner about its axis relative to incoming feedstock metal strip, bending means for bending the twisted strip into a predetermined radius of curvature and means for varying the radius of curvature of the strip exiting the bending means.

Where the planform shape and twist are produced sequentially an optional side-face grinding operation may be conducted prior to forming the desired twist.

The side-face grinding operation may, however, be omitted thus making the rings particularly economic to produce. A grinding operation may be conducted after the twist has been formed on the ring. Such a grinding operation may be small and may be confined to removal of the sharp edges at top and bottom of the dished ring.

The dishing of the ring may be positive or negative i.e. the ring has a concave or convex aspect when viewed from above.

The degree of dishing may lie in the range from 0.025 to 0.75 mm, preferably in the range from 0.05 to 0.125 mm.

The outer rubbing face which co-operates with the associated cylinder wall may be barrelled, tapered or coated as is known in the art.

In order that the present invention may be more fully understood, examples will now be described by way of illustration only with reference to the accompanying drawings, of which.

Figure 1:
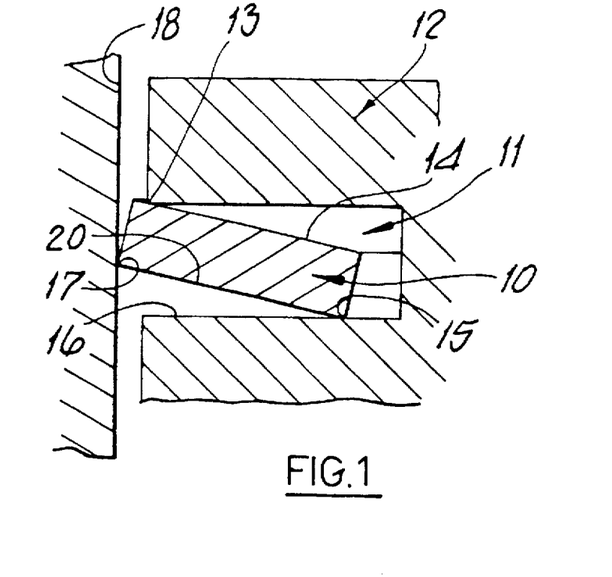
FIG. 1 shows a section detail in elevation through a piston having a piston ring according to the present invention in the top ring groove position.
Figure 2:
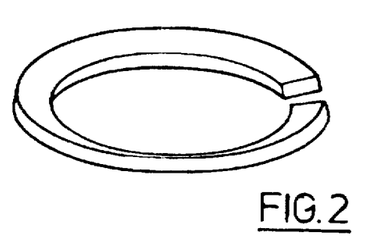
FIG. 2 shows a perspective view of the piston ring of FIG. 1 having positive dishing.

Referring now to FIGS. 1 and 2 and where the same features are denoted by common reference numerals.

A piston ring 10 is shown in the top piston ring groove 11 of a piston 12. The piston ring is shown in its equilibrium position at rest. It should be emphasized that the degree of dishing and clearances are shown greatly exaggerated. The upper outer edge 13 of the ring groove 11 abuts the top face 14 of the piston ring whilst the lower inner peripheral edge 15 of the ring rests on the lower face 16 of the groove.

The lower outer peripheral edge 17 of the ring is in contact with the co-operating cylinder wall 18.

In operation and under the influence of combustion gas pressure in the cylinder, the ring 10 is flattened out so that the bottom face 20 of the ring is in contact with the bottom face 16 of the groove 11.

As the gas pressure diminishes the ring springs back to its "equilibrium" position shown in FIG. 1. Eventually, under inertia loading, the ring either retains its "equilibrium" position or becomes flattened against the upper face of the groove 11. There is therefore, at all times, a gas seal between the ring 10, its groove 11 and the cylinder wall 18.

Figure 3:
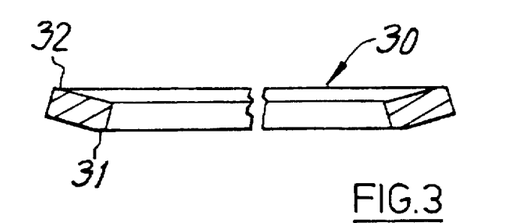
FIG. 3 shows a modification of the piston ring of FIGS. 1 and 2.

FIG. 3 shows a ring 30 which has been subjected to a light grinding operation such that the lower peripheral edge 31 and upper outer peripheral edge 32 have been endowed with small "flats" to ensure that the ring is planar.

Figure 4:
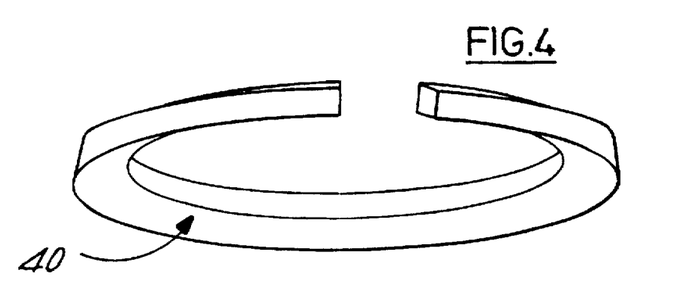
FIG. 4 shows a perspective view of a piston ring having negative dishing.
Figure 5:
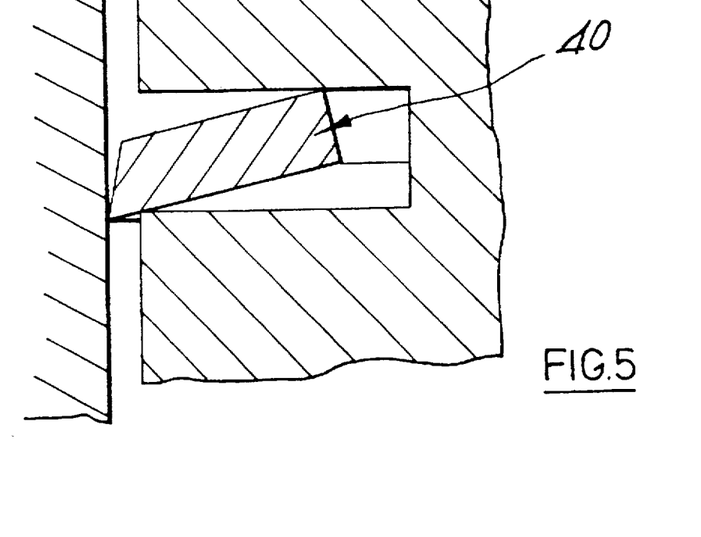
FIG. 5 shows a section detail in elevation through a piston having the piston ring of FIG. 4 therein.

FIGS. 4 and 5 show a piston ring 40 having negative dishing. The essential functions and operation of the ring are, however, similar to those described with reference to FIGS. 1 and 2.

The rings described above may be formed from stainless steel or any suitable steel which retains its temper at the ring working temperature.

Figure 6:
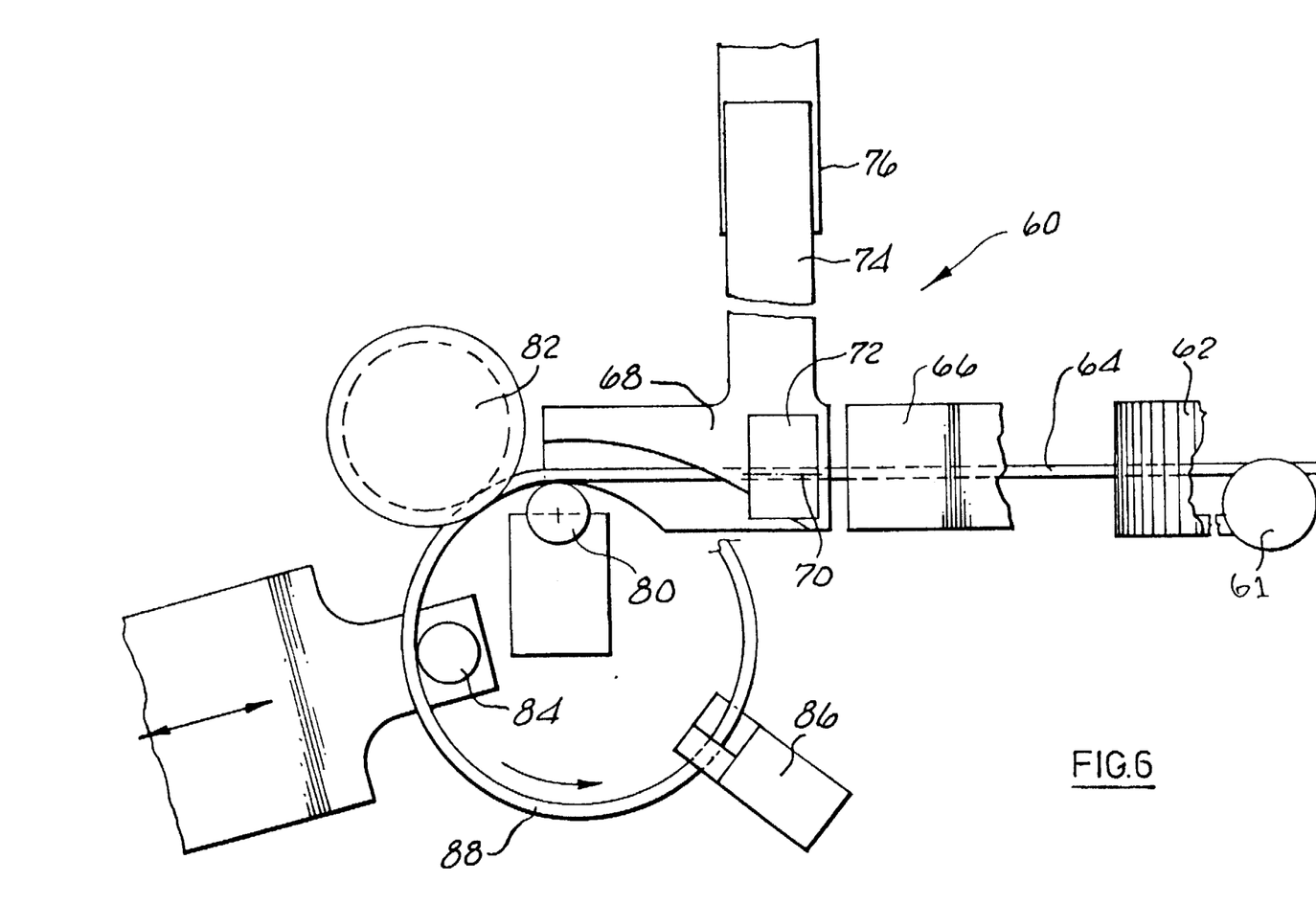
FIG. 6 shows a schematic diagram of apparatus for making piston rings according to the present invention.
Figure 7:
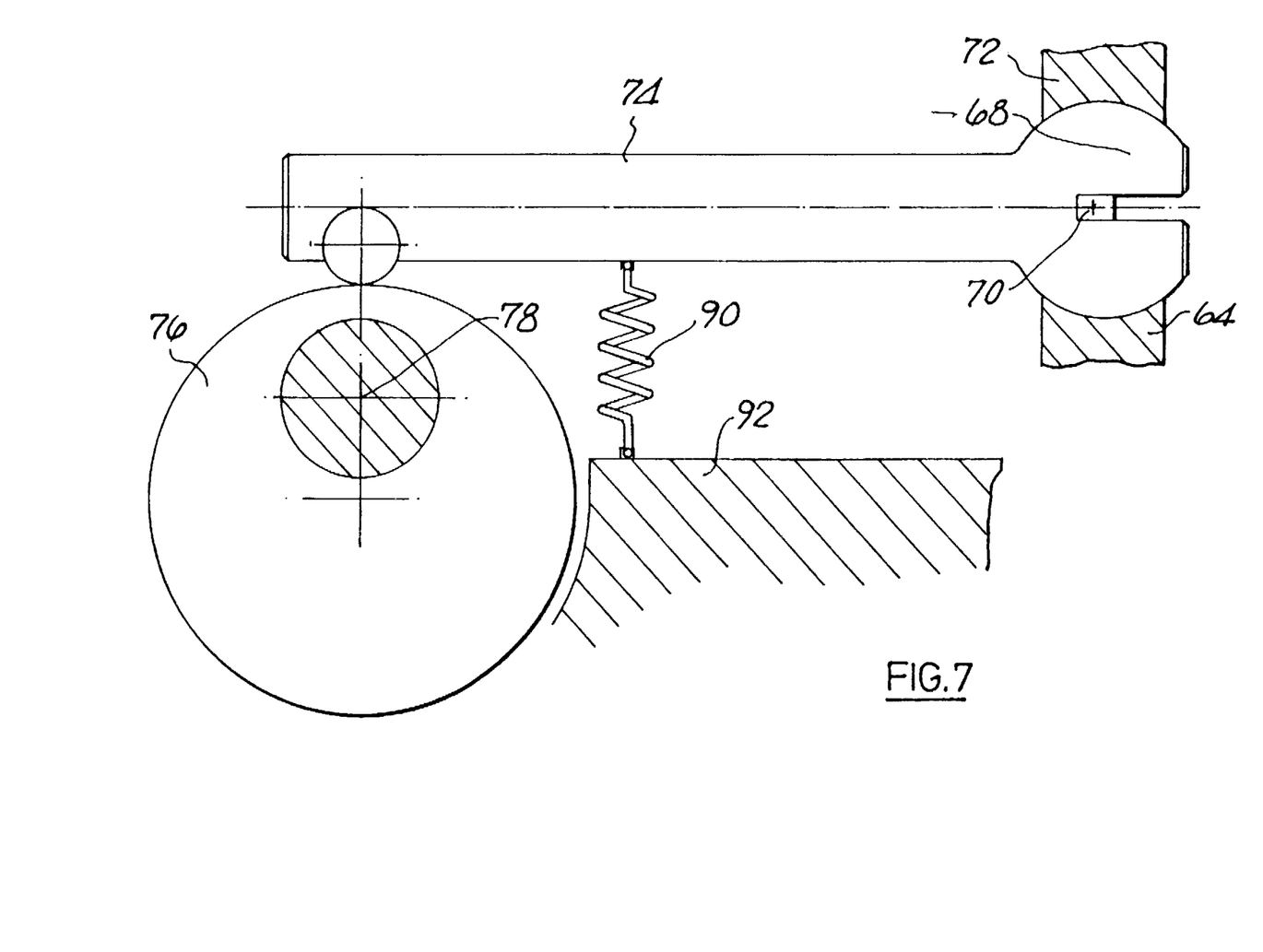
FIG. 7 shows a view in elevation of the twisting means of the apparatus of FIG. 6.

Referring now to FIGS. 6 and 7 where CNC apparatus for bending a metal strip into a non-circular profile having a controlled degree of twist is shown generally at 60. The apparatus comprises a servo-driving motor 61 and a series of straightening and feed rollers 62 for withdrawing strip 64 from a spool (not shown) and feeding the strip into a first fixed guide 66 for maintaining alignment. The strip passes from the guide 66 into a second guide 68 which is pivotable, substantially about the axis 70 of the strip. The guide 68 is pivotable in a cylindrical bearing 72 and is moved about the axis 70 by a lever arm 74, which is moved by a driven eccentric 76, driven by a servomotor 75 (FIG. 10) and; oscillatable about an axis 78 under command from a control system (See later FIGS. 10, 11, 12 and 13). The strip 64 passes from the guide 68 into first bending means, comprising a fulcrum pin 80 and fixed abutment 82, and second bending means comprising a computer controlled servo-motor 83 (See FIG. 10) operating a moveable finger 84 driven by a linkage 85 (See FIG. 10). A high speed cropping device 86 is provided to sever the rings 88 so produced from the strip 64. The arm 74 is held against the eccentric by a spring 90 which is located between the arm and a fixed part 9 of the apparatus.

Figure 8:
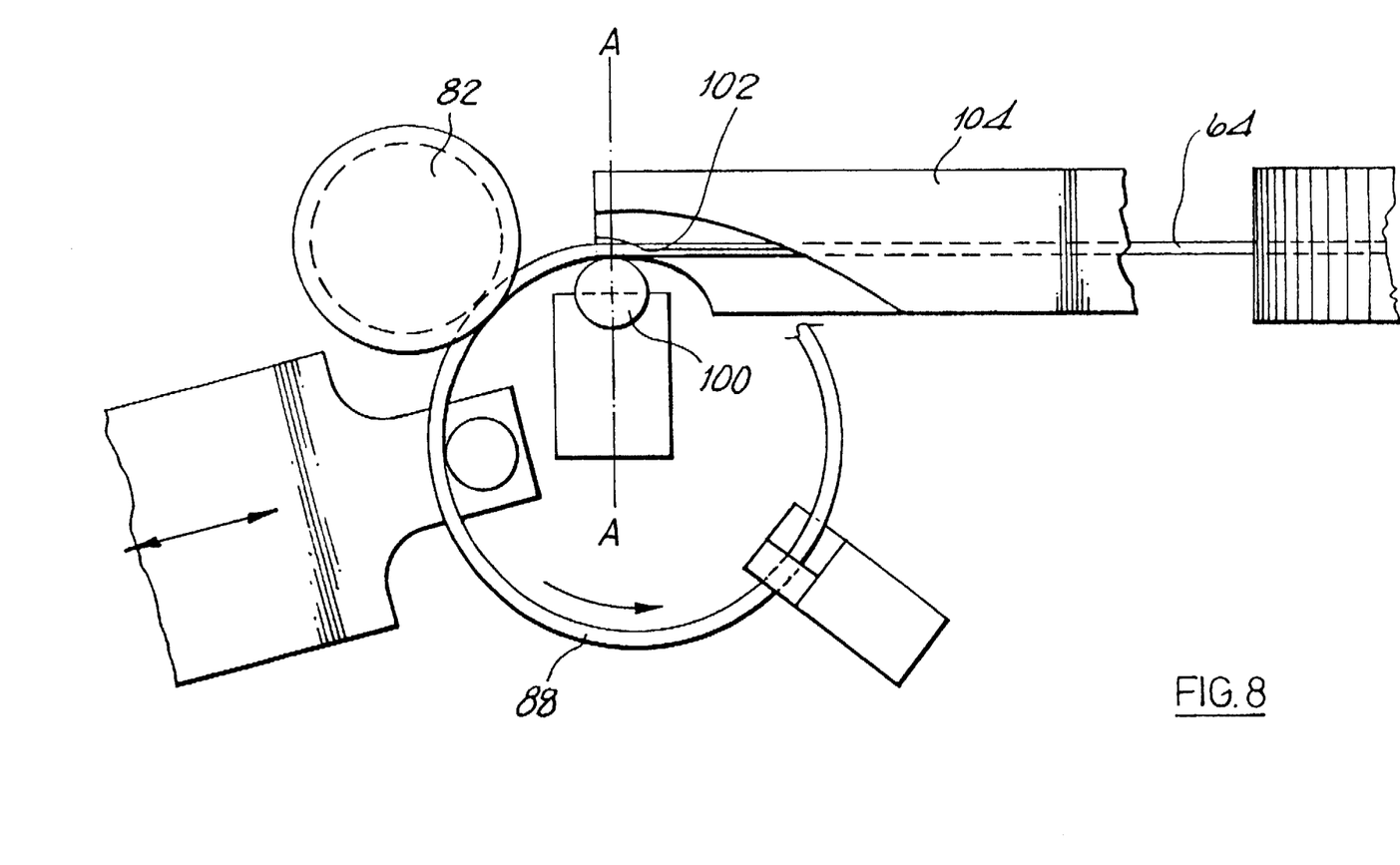
FIG. 8 shows a schematic plan view of an alternative apparatus for making piston rings according to the present invention.
Figure 9:
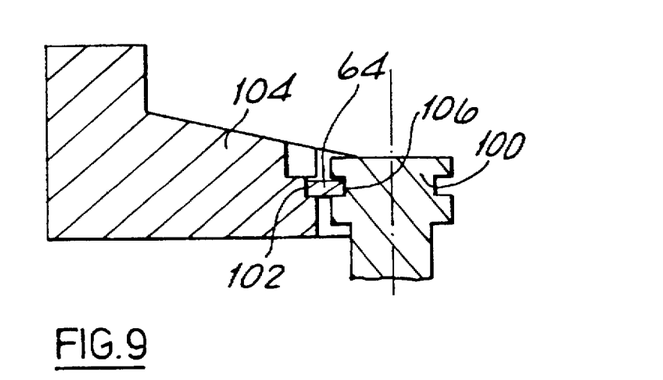
FIG. 9 shows a section through the line AA of FIG. 8.

FIGS. 8 and 9 show an alternative embodiment wherein the twist is applied to the strip 64 by means of a grooved guide and fulcrum pin 100 which moves axially relative to a guide groove 102 in fixed guide member 104. The guide and fulcrum pin 100 is controlled in its vertical position by a servo motor (not shown) in response to control signals from the control system (See FIGS. 10, 11, 12 and 13) By altering the relative vertical position of the groove 106 of the pin 100 to the groove 102 of the guide 104, either positive or negative dishing of the resulting ring 88 may be produced.

Figure 10:
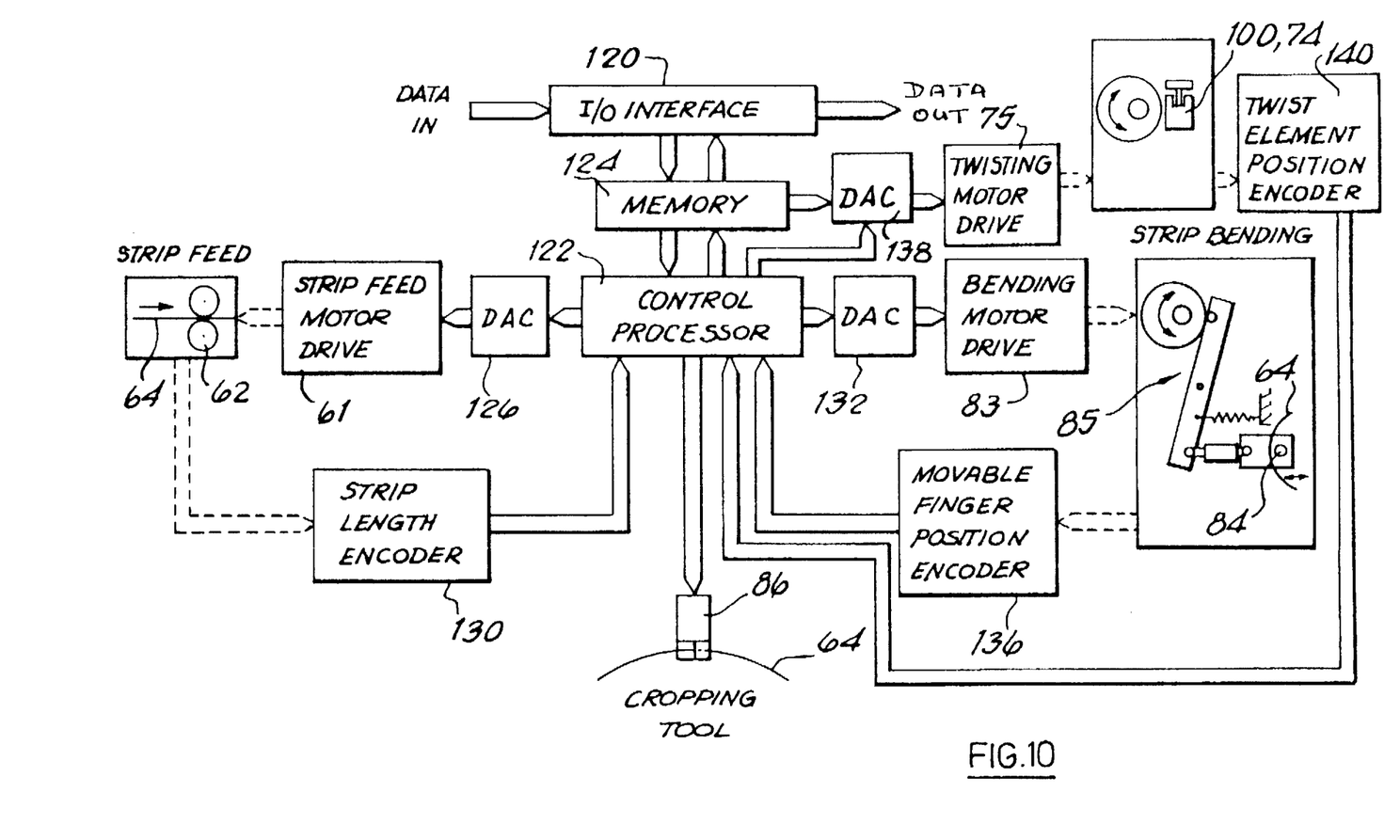
FIG. 10 shows a flow chart of a control system for the apparatus shown in FIGS. 6 to 9.

A more detailed description of the operation of the control system, with reference to FIG. 10 now follows.

As shown in FIG. 10, a control system for the apparatus described above comprises an input-output interface device 120 communicating with a control processor 122 via a memory 124. The control processor 122 is arranged to receive data from, and to transmit data to, the memory 124, and may comprise a type 68000 microprocessor supplied by Motorola Inc. The input-output device 120 operates in a manner compatible with the control processor 122, and, in particular is arranged to transmit data to, and receive data from, the memory 124. Further, the input-output device 120 is to receive input data IN, for example, from an operator, say, via a keyboard (not shown); and is to provide output data OUT for the operator, for example, the device 120 driving a visual display unit (not shown).

The control processor 122 provides information, via a digital-to-analogue converter (DAC) 126, to control the servo-driving motor 61 for feeding the metal strip 64 through the apparatus. In particular, the servo-motor 61 drives the feed rollers 62. The feed rollers 62 are coupled operably to a transducer, comprising an encoder 130, the encoder providing signals to the control processor 122, each such signal being representative of the strip length having passed through the rollers.

The control processor 122 also provides information, via a DAC 132, to control the servo motor 83 for varying the position of the movable finger 84, and so to control the radius of curvature of the strip portion instantaneously at the movable finger 84. In particular, the servo-motor 83 drives the linkage 85, as described above. One convenient part of the movable finger mechanism is coupled operably to a transducer, comprising an encoder 136, providing signals each representative of the instantaneous position of the finger 84. The information representative of the position of the finger 84 is supplied by the encoder 136 to the control processor 122.

The control processor 122 also provides information, via a DAC 138, to control a servo motor 75 for varying the position of the movable twist control lever arm 74 or twist control element 100 and so control the twist of the strip portion instantaneously at the movable element. One convenient part of the movable twist control mechanism is coupled operably to a transducer, comprising an encoder 140, providing signals, each representative of the instantaneous position of the arm 74 or element 100. The information representative of the position of the lever arm 74 or element 100 is supplied by the encoder to the control processor 122.

Stored in the memory 124 is data defining the predetermined non-circular profile, and twist profile of a required ring. This profile data is obtained by employing, say, known finite element analysis techniques. There are addressable locations in the memory in this respect, at each such location the appropriate profile data for a 0.1° of arc of the ring, (or for a portion of the ring subtending an angle of 0.1° at the centre of curvature of the portion), is stored. In particular, at each such location there is stored profile data comprising the radius of curvature required for the corresponding portion of the ring, the degree of twist related to the axial plane of the ring 88 and the length of the strip 64 required in forming the part of the ring up to, and including, this ring portion.

The first location has stored thereat the appropriate profile and twist data corresponding to the leading portion of the strip 64 to form the ring.

Also stored at a CROPPING location in the memory 124, and capable of being addressed by the control processor 122, is information defining the portion of the ring being formed, comprising the appropriate 0.1° of arc of the ring, and at the movable finger 84, when the previously formed ring is to be cropped from the part of the strip 64 having passed through the twisting and bending means. The information stored at the CROPPING location is provided as a result of experimentation when setting-up the apparatus to produce the ring, and is entered into the memory 124 via the operator's keyboard.

As stated below, and in relation to each ring, the encoder 130 detects the instantaneous length of the strip having passed through the feed rollers. However, the corresponding length of the strip of use in the control of the formation of the ring, and stored at each profile data location in the memory, takes into account the spacing between the two encoders 130 and 136 in the apparatus, the dimensions of relevant parts of the apparatus, and the shape of the strip as it passes between the feed rollers 62 and the movable finger 84. The control processor 122 is arranged to convert the stored strip length values to values corresponding to those detectable by the encoder 130, so that a direct comparison can be made therebetween.

This is in addition to the control processor also being arranged to convert any demanded change in the velocity of feeding of the strip, as described below, and as determined by the control processor, to a corresponding output signal, to cause the appropriate change of the drive of the servo-motor 61, and to effect the demanded change in the feeding velocity of the strip.

Similarly, the encoder 136 does not detect the instantaneous position of the movable finger 84, but a magnitude in a predetermined relationship thereto; and the position of the movable finger is in a predetermined relationship to the provided radius of curvature of the strip portion. The control processor 122 is arranged to convert the stored radius of curvature values to values corresponding to those detectable by the encoder 136, so that a direct comparison can be made therebetween, as described below.

This is in addition to the control processor also being arranged to convert any demanded change of the radius of curvature value, as described below, and as determined by the control processor, to a corresponding output signal, to cause the appropriate actuation of the servo-motor 83, and to effect the change in the radius of curvature.

Similarly, the encoder 140 does not detect the instantaneous position of the lever arm 74 or twisting element 100 but a magnitude in a predetermined relationship thereto; and the position of the arm or twisting element is in a predetermined relationship to the twist of the strip portion provided by the guides 66 or 104. The control processor 122 is arranged to convert the stored twist values to values corresponding to those detectable by encoder 140 so that a direct comparison can be made therebetween as described below.

This is in addition to the control processor also being arranged to convert any demand change of the twist value as described below, and as determined by the control processor, to a corresponding output signal, to cause the appropriate actuation of the servo motor 75, and to effect the change in twist.

Figure 11:
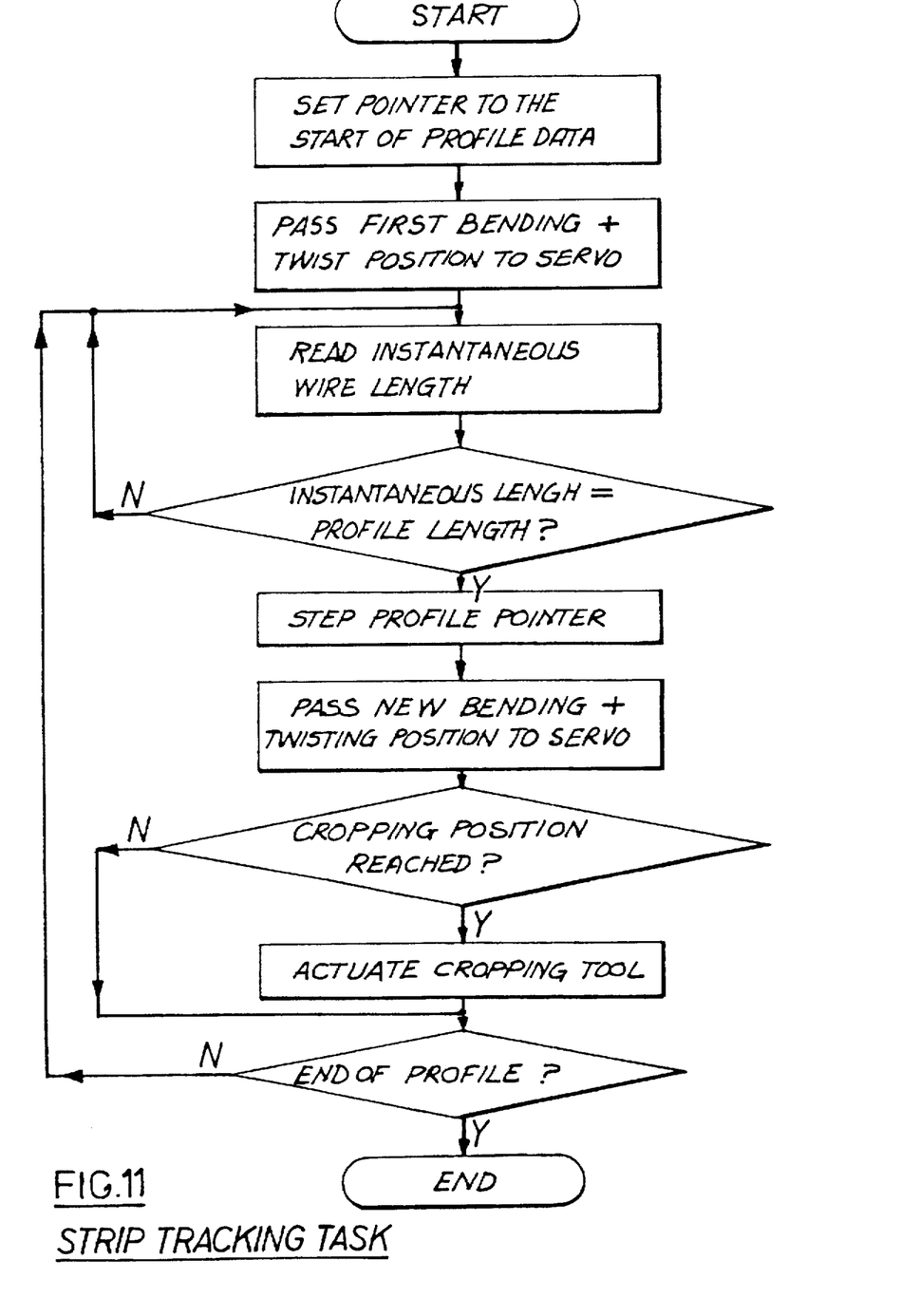
FIG. 11 shows a block diagram of the strip tracking task of the control system of FIG. 10.
Figure 12:
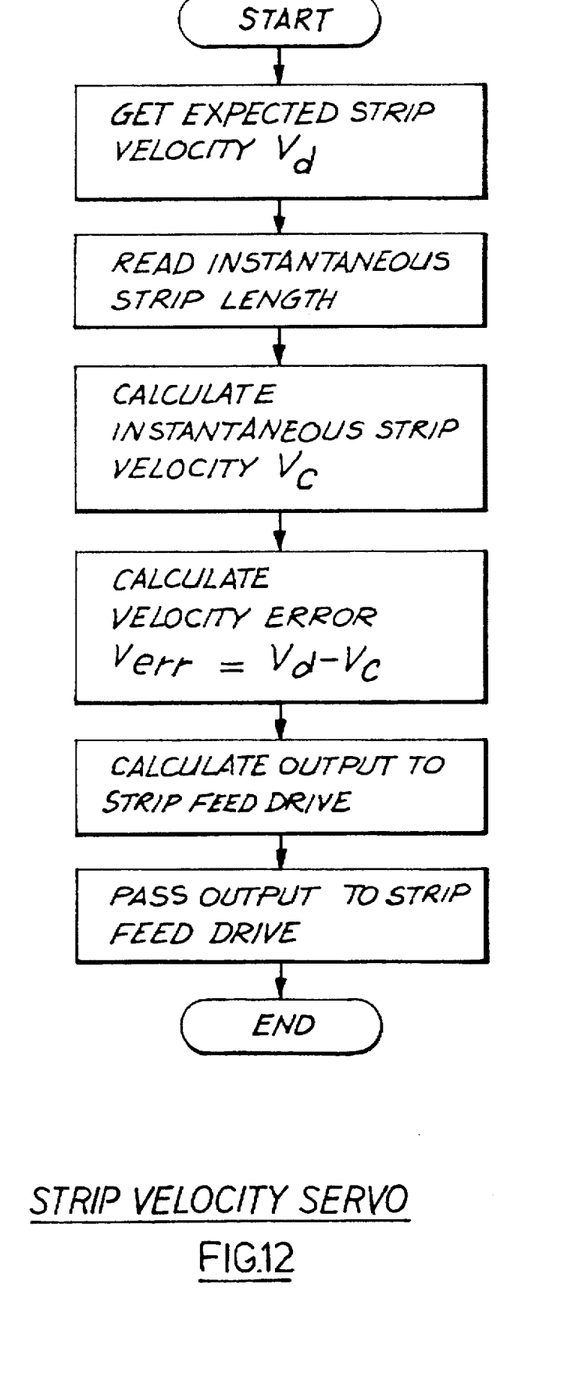
FIG. 12 shows a block diagram of the function of the strip velocity servo of the control system of FIG. 10.
Figure 13:
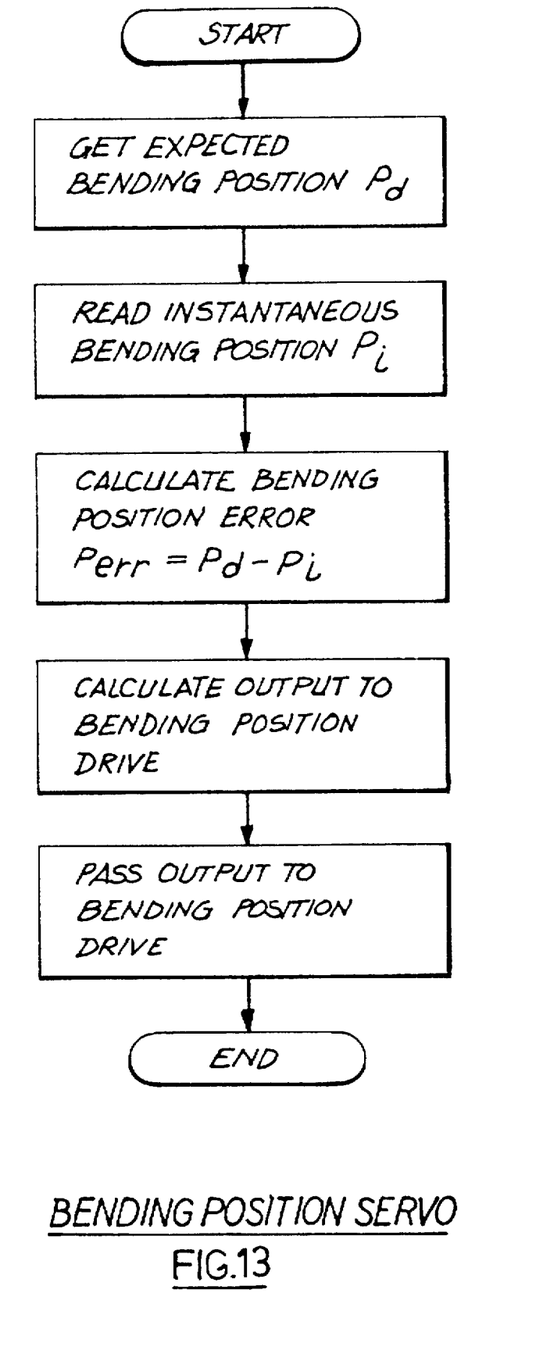
FIG. 13 shows a block diagram of the function of the bending position servo of the control system of FIG. 10.

The manner of operation of the control processor 122 partially is shown in the flow charts of FIGS. 11 to 13.

At the start of the operation of the control processor in forming the ring, and as indicated in the flow chart of FIG. 11, the data at the first location of the ring profile and twist data in the memory 124 is addressed by the control processor.

From the reading of the value of the radius of curvature and twist of the first ring portion, and stored at the first location of the ring portion data, the control processor obtains the expected value $P_d$ and of $T_d$ of the output of the encoder 136 corresponding to the required first position of the movable finger 84 and twist element 74 or 100.

The operation of the control processor then enters a routine which is repeated in a repetitive manner. This part of the operation of the control processor is controlled by a clock, and each constituent routine of the operation is entered after each millisecond during the formation of the required ring. In the first 250 microseconds of each routine, and as is indicated in the flow chart of FIG. 12, a strip velocity servo loop is in operation.

In the operation of the strip velocity servo loop in the first routine, and from the reading of the value of the first strip length to pass through the feed rollers 62, and stored at the first location of the ring profile and twist data; and because the routine is clocked to last for one millisecond; the control processor obtains the currently expected velocity of the strip feed $V_d$.

Because, initially, the strip is being fed, for example, in the manner required in the formation of the final portion of the previous ring formed by the apparatus; or otherwise; the control processor obtains the instantaneous actual strip velocity $V_c$, by immediately previously having read, and stored, two outputs of the encoder 130 with a millisecond interval therebetween, and by subtracting the first such encoder output from the second output.

Any strip velocity error $V_{err}$ between the currently expected velocity $V_d$ and the instantaneous actual velocity $V_c$ is determined by the control processor; and the control processor derives the corresponding change in speed of the servo-motor 61 in order to tend to eliminate $V_{err}$. The appropriate output signal is supplied by the control processor to the servo-motor 61, via the DAC 126. This completes the operation of the strip velocity servo loop in the first routine.

Then, also within the 250 microsecond period, referred to above, a bending position servo loop is in operation in the manner indicated in the flow chart of FIG. 13. As referred to above, there has been obtained the currently expected value $P_d$ and $T_d$ of the output of the encoders 136, 140 corresponding to the current required position of the movable finger 84 and twist element 74 or 100 respectively.

The control processor also reads the instantaneous actual output $P_i$ and $T_i$ of the encoder 136, 140 possibly, respectively, comprising the position of the encoders during the formation of the final portion of the previous ring, and read, and stored, by the control processor.

Next the control processor calculates any error $P_{err}$ and $T_{err}$ between $P_d$ and $T_d$ and $P_i$ and $T_i$; and derives the corresponding amount of actuation of the servo-motors 75, 83 in order to tend to eliminate $P_{err}$ and $T_{err}$. The appropriate output signal is supplied by the control processor to the servo-motors 75, 83 via the DAC 132, 138. This completes the operation of the bending and twisting position servo loop in the first routine.

After the end of the 250 microsecond period, with the required strip feed velocity, and the required position of the movable finger 84 twist element 74 or 100 demanded, and within the final 750 microsecond period of the first clocked routine, the control processor performs a strip tracking task, as indicated in the flow chart of FIG. 11.

The strip tracking task comprises a sub-routine to be performed repetitively until interrupted at a predetermined point in the routine, or until it is determined that the instantaneous strip length having been fed through the feed rollers 62 is equal to the strip length value stored at the first profile data location in the memory.

At the start of the sub-routine, whilst forming the first portion of the ring, the control processor 122 reads the instantaneous output of the encoder 130 and representative of the strip length as having passed through the feed rollers 62.

The control processor 122 then decides whether, or not, the thus instantaneously detected strip length, as having passed through the feed rollers, is equal to the value of the strip length expected to have passed through the feed rollers, and stored at the first memory location currently being addressed. This completes the sub-routine. If the decision is negative, the output of the encoder 130 is read again; and the control processor again is required to decide whether, or not, the same criterion has been obtained. The sub-routine is repeated in a repetitive manner until the decision is affirmative; or until the repetition of the sub-routine is interrupted, as referred to above.

Then, and also within the first routine, the control processor addresses the second location of profile and twist data within the memory 124, at which location is stored profile and twist data relating to the second 0.1° of arc of the ring. The data relating to the required radius of curvature of the second 0.1° of arc of the ring is read by the control processor.

The control processor then decides whether, or not, the information defining the portion of the ring, comprising the appropriate 0.1° of arc of the ring, and stored at the CROPPING location within the memory 124, is the same as the information defining the second portion of the ring, and stored at the second location of the profile and twist data within the memory.

Irrespective of whether this decision is negative, or affirmative, in the final step of the routine, the control processor decides whether, or not, the second location of the profile and twist data within the memory is the final such location of the profile and twist data of the ring.

If this decision is also negative, the second routine is commenced, under the control of the clock, and at the end of the one millisecond period allowed for the first routine.

In the first 250 microseconds of the second routine, the strip velocity servo loop again is operated in the manner indicated in the flow chart of FIG. 12. This time the instantaneous actual strip velocity $V_c$ is determined by using the appropriate output of the encoder 130 read, and stored, in the first routine.

Then, the twist and bending position servo loop again is operated in the manner indicated in the flow chart of FIG. 13. This time the instantaneous actual output $P_i$ and $T_i$ of the encoder 136, 140 is the appropriate output of the encoders 136, 140 read, and stored, by the control processor in the first routine.

Next the sub-routine comprising the strip tracking task is performed, until the instantaneous strip length having been fed through the feed rollers is equal to the strip length stored at the second profile data location in the memory; or until the sub-routine is interrupted, as referred to above.

The second routine is completed, including reading the profile data at the third location in the memory.

The routine is repeated, in a repetitive manner, whilst the ring is being formed with the predetermined non-circular profile in accordance with the profile data stored in the memory 124 and the predetermined twist profile also in memory 124. This repetition occurs until the control processor 122 decides that the information defining a portion of the ring, and stored at the CROPPING location within the memory 124, is the same as the information defining the portion of the ring at the profile data location within the memory currently being addressed by the control processor. In response to this affirmative decision, the control processor causes the cropper 86 to be actuated. This cropping action of the previously formed ring does not interfere adversely with the formation of the ring being produced. In the same routine, inevitably, a further decision is made that the simultaneously addressed location of the twist and profile data in the memory 124 is not the final such location.

Subsequently, the routine is continued to be repeated, in a repetitive manner; but the cropper 86 is not actuated again until after the ring being formed is completed.

The repetition of the routine of FIGS. 11 to 13 does not cease until the control processor 122 decides, in the final step of a routine, that the simultaneously addressed location of the twist and profile data in the memory 124 is the final such location. The formation of the ring, and the operation of the control processor in forming the ring, are now complete.

Normally the control processor 122 then repeats the above operation, without interruption of the wire feed to the bending means, and in order to form a subsequent ring.

Figure 14:
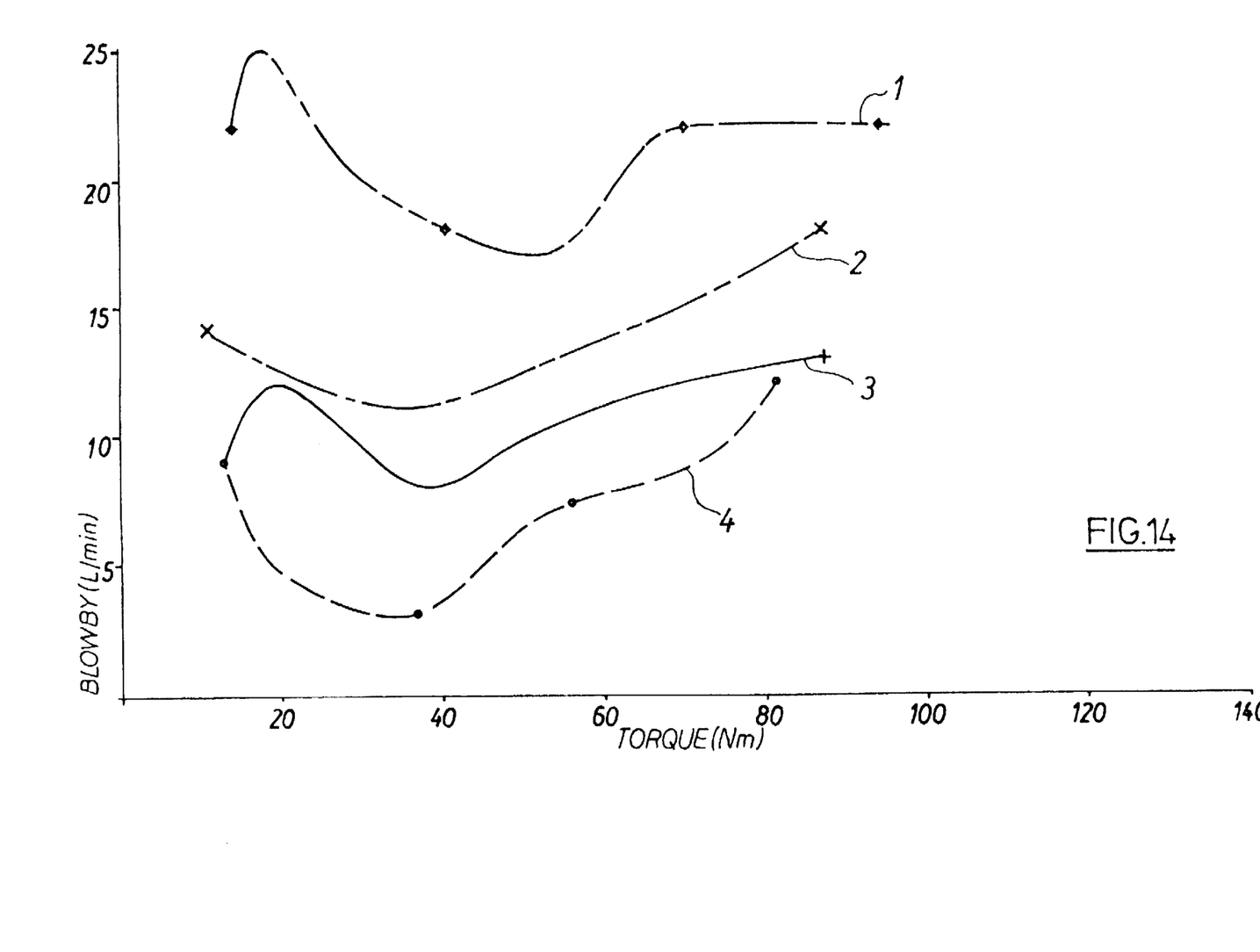
FIG. 14 which shows a graph of piston ring gas blow-by versus torque of a 1.6 L engine tested with various types of top piston ring.

FIG. 14 shows a graph of the effect of the top compression ring on gas blow-by versus torque at 6000 rev/min for a 1.6L gasoline fueled engine. Curves 1 and 2 show the effect of two different conventional cast iron piston rings having chromium and nitrocarburised coatings respectively. Curve 3 is a flat ring made by the strip bending technique whilst curve 4 shows the performance of rings according to the present invention having positive dishing. Curve 4 shows that under all conditions the gas blow by performance of rings according to the present invention is superior to known rings.

I claim:

1. A piston ring for a piston, the piston ring comprising a single ring to reside in a cooperating piston ring groove, the piston ring having both a predetermined noncircular profile as viewed in plan along its axis, and a predetermined nonuniform degree of twist or dishing of the ring material about an axis extending along the ring material so as to be of nonuniformly dished section around the piston ring periphery, the degree of twist and hence the orientation of the dished section at each point of the ring periphery being predetermined in accordance with the radius of curvature of the ring at said point as viewed in plan along distribution of pressure by the ring on a cooperating cylinder wall, said predetermined nonuniform degree of twist being controlled and effected by displacing instantaneously engaged portions of the ring material about said axis, and wherein the ring has free ends and the maximum degree of twist or dishing is at the free ends.

2. Apparatus for the manufacture of a piston ring having a predetermined noncircular planform and a nonuniform degree of twist of the ring material about an axis extending along the ring material so as to be of nonuniform dished section around the piston ring periphery, the apparatus comprising feed means for driving a metal strip into guide means and into bending means for bending the strip continuously into consecutive rings each of predetermined noncircular planform so as to form a ring of non-circular profile as viewed in planform along the ring axis, and strip twisting means to introduce twist in a controlled nonuniform manner into the strip about an axis extending along the strip by displacing instantaneously engaged portions of the strip, in a predetermined and controlled manner, about said axis and transversely to a plane in which otherwise the strip is fed through the apparatus, and means for controlling said twisting means so as to introduce twist at each point along said strip in dependence on the curvature radius to be formed at said point so as to form a noncircular piston ring of non-uniformly dished section around the ring periphery, the degree of twist and hence the orientation of the dished section at each point of the ring periphery being determined in accordance with the radius of curvature of the ring at said point as viewed in plan along the ring axis such that, in operation of the produced ring, there is a required distribution of pressure by the ring on a cooperating cylinder wall.

3. Apparatus according to claim 2 wherein the strip twisting means comprises a pivotable guide having a groove for receiving the strip, which groove is pivotable substantially about the axis of the received strip.

4. Apparatus according to claim 3 wherein the pivotable guide means is controlled by a motor-driven eccentric via a lever arm.

5. Apparatus according to claim 2 wherein the strip twisting means comprises a pair of relatively displaceable grooved members.

6. Apparatus according to claim 5 wherein the grooved members also form part of the guide means and bending means.

* * * * *